United States Patent [19]

Falk

[11] Patent Number: 4,692,675

[45] Date of Patent: Sep. 8, 1987

[54] CONTROL AND ENERGIZATION CIRCUIT FOR A BRUSHLESS D-C MOTOR

[75] Inventor: Gerhard Falk, Rossdorf, Fed. Rep. of Germany

[73] Assignee: Robert Bosch GmbH, Stuttgart, Fed. Rep. of Germany

[21] Appl. No.: 893,333

[22] Filed: Aug. 5, 1986

[30] Foreign Application Priority Data

Aug. 10, 1985 [DE] Fed. Rep. of Germany ....... 3528765

[51] Int. Cl.$^4$ ............................................ H02K 29/10
[52] U.S. Cl. .................... 318/254; 318/138; 318/439
[58] Field of Search ................ 318/138, 254, 439, 480

[56] References Cited

U.S. PATENT DOCUMENTS

| | | | |
|---|---|---|---|
| 3,609,492 | 9/1971 | Rakes | 318/254 |
| 3,619,746 | 11/1971 | Thornton | 318/138 |
| 3,783,359 | 1/1974 | Malkiel | 318/254 |
| 3,842,332 | 10/1974 | Heine et al. | 318/138 X |
| 3,909,684 | 9/1975 | Smith, Jr. | 318/138 |
| 4,233,548 | 11/1980 | Kirtley, Jr. | 318/254 X |
| 4,283,664 | 8/1981 | Ebert | 318/254 |
| 4,435,673 | 3/1984 | Hagino et al. | 318/254 |

FOREIGN PATENT DOCUMENTS

| | | | |
|---|---|---|---|
| 58-36160 | 3/1983 | Japan | 318/254 |
| 59-92797 | 5/1984 | Japan | 318/138 |

OTHER PUBLICATIONS

"ATM" Apr. 1968, pp. 79-82, Article by Gerhard Kroger, Kollektorlose Gleichstrommotoren (Brushless D-C Motors).

Primary Examiner—William M. Shoop, Jr.
Assistant Examiner—Bentsu Ro
Attorney, Agent, or Firm—Frishauf, Holtz, Goodman & Woodward

[57] ABSTRACT

A ring-connected d-c brushless stator winding has winding sections (I, II . . . XI), serially connected by junctions (1, 2 . . . 11) and selectively and sequentially connected to a source of d-c power (15, 16) by controlled switches (20, 21), the connection of the switches being selectively controlled by a logic network responsive to a rotor position sensor (26). In accordance with the logic, when the rotor position sensor senses that the rotor is in alignment with a junction, the respective junction is connected to one terminal and, through the logic, which includes an OR-gate (28), a NOR-gate (29) and an AND-gate (30) which receive input signals from sensors associated with other junctions, the junction beneath the sensor sensing the rotor at the position is connected to one terminal of the source, whereas junctions effectively 180°-electrical displaced are connected by the switches controlled by the logic, to the other d-c terminal; as the rotor moves, the field travels around the ring stator.

12 Claims, 3 Drawing Figures

CONTROL AND ENERGIZATION CIRCUIT FOR A BRUSHLESS D-C MOTOR

Reference to related publication:
"ATM", April 1968, pp. 79–82, article by Gerhard Krüger, "Kollektorlose Gleichstrommotoren" ("Brushless D-C Motors"). U.S. Pat. No. 3,619,746, the disclosure of which is hereby incorporated by reference.

The present invention relates to d-c motors which do not have a rotating commutator, also referred to as "brushless d-c motors", and more particularly to a control and energization circuit for such a motor, having a stator winding divided into winding sections which are connected in series to form a closed ring.

BACKGROUND

Various types of brushless d-c motors and energization circuits have been proposed in which the stator winding is formed of a continuous group of series connection winding sections or portions distributed about the circumference of the stator, and connected in a closed ring, with junction points at the connection of the respective windings. The rotor may be a permanent magnet rotor, in which the motor then will be truly "brushless"; or it may be an electromagnetically excited rotor having slip rings to supply field energy thereto. The referenced publication "ATM" of April 1968, pp. 79–82, article by Gerhard Krüger "Kollektorlose Gleichstrommotoren" ("Brushless D-C Motors") describes a brushless d-c motor in which the windings are stationary, secured to the stator, and the magnetic flux is generated by a permanent magnet forming the rotor. In known d-c motors of this type, current is switched to respective winding sections of the stator by transistors forming contactless switches which are controlled between conductive and non-conductive state by Hall generators. The Hall generators are located in the magnetic field of the rotor. The current can be switched and reversed under control of the transistors. Known circuits of this type are complex and, in order to reduce the circuit component requirements, the windings can be connected, not in series, but rather in a star or common center connection to be sequentially connected to a current source in dependence on the relative position of the rotor with respect to the winding sections. Such motors function satisfactorily; however, the output torque is undulating and variable.

Electronic commutating systems have previously been proposed—see U.S. Pat. No. 3,619,746—for use with a d-c motor having an even number of stationary windings in the stator connected in ring connection. The rotor field is generated either by a permanent magnet or by an electromagnet receiving energy over slip rings. Hereinafter, the invention will be described in connection with a "brushless" motor in the sense that there are no brushes selectively contacting commutator segments; brushes which supply current to slip rings are not here considered, so that the term "brushless" motor is deemed to include also excited field motors.

U.S. Pat. No. 3,619,746 also describes a circuit to energize the respective windings by connecting to junctions of serially connected winding sections a pair of transistors which, in dependence on an external clock source, or signals from a rotor position detector are respectively controlled to conduction, so that on each two diametrically oppositely located junctions one terminal or the other of a power source are connected. The circuit requirements to ignite and extinguish the thyristors, that is, to control them to conduction and then to interrupt their conduction, is considerable. Additionally, voltage separation between the control circuit and the supply circuit must be observed, so that the overall circuit requirements are increased further thereby.

THE INVENTION

It is an object to provide a control and energization circuit for control of a brushless d-c motor, that is, a motor not having brushes engaging a movable commutator, which is simple and reliable, and which lends itself to construction in form of an intergrated circuit, thereby permitting miniaturization of the control and energization circuit.

Briefly, each junction of the ring-serially connected winding sections is connected to a pair of switches. A first switch controllably connects a first terminal, e.g. a positive terminal of the energization source to the associated junction, and the second switch controllably connects the second terminal, e.g. the negative terminal of the source to the associated junction. The first switch is directly controlled from a position sensing control element or is, respectively, to a signal from a position sensing, such as an optical pick-up or the like, to establish connection of the associated junction with a first terminal of the source when the rotor position sensing element senses the presence of a rotor pole at a reference position with respect to the associated junction, for example beneath the associated junction; the second switch is controlled to conduction by a second switch control circuit which includes a logic circuit. The electrical circuit from the first terminal, e.g. the positive terminal, through the windings to the second terminal, e.g. the negative terminal, is thus completed upon closing of the second switch which, however, due to the logic connection, will not be the second switch associated with the junction which established the direct connection to the first, for example positive terminal, but rather, in accordance with a feature of the invention, and in accordance with the logic of the logic circuit, a junction which is electrically 180° displaced from this first junction. In a two-pole rotor, the electrical and mechanical degrees will coincide.

The system has the advantage that the logic circuit elements can readily be constructed in integrated circuit form. This permits a multiplicity of junction points, and hence quiet and uniform running of the motor with hardly any variations or undulations in output torque; with only little inertia, the rotor will run smoothly with no output torque variations.

In accordance with a preferred feature of the invention, an odd number of winding sections are used, thereby still further improving the smooth running of the motor.

DRAWINGS

DETAILED DESCRIPTION

Figure 1:
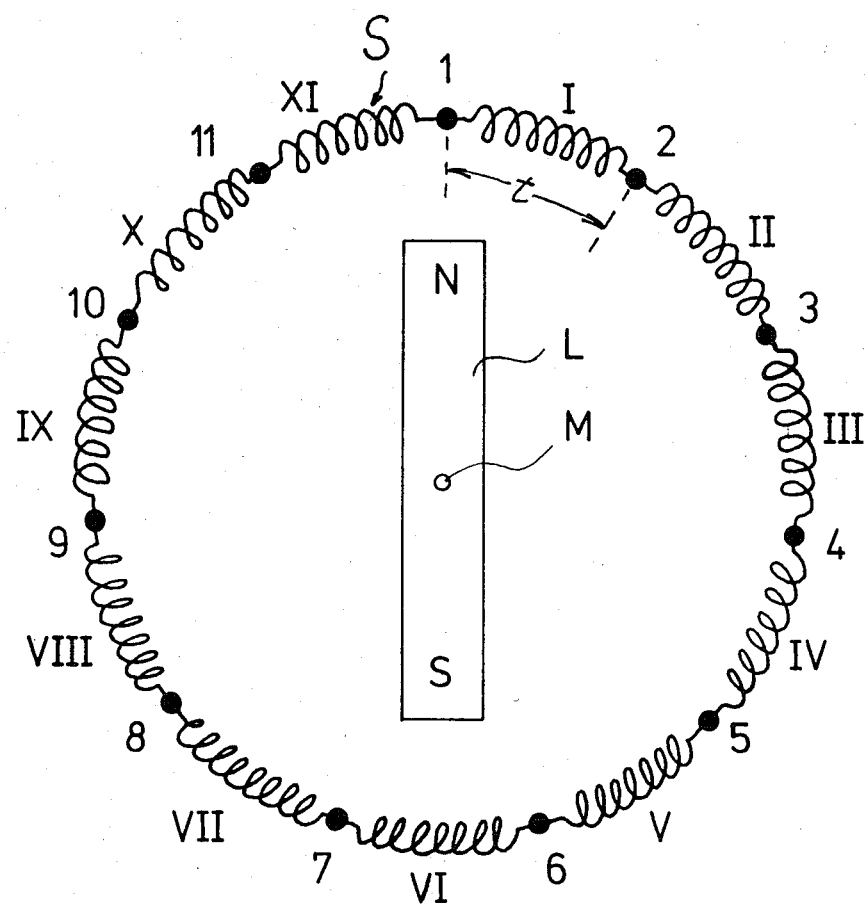
FIG. 1 is a schematic equivalent diagram of the stator winding of a motor having eleven winding sections.

The winding diagram is shown schematically in FIG. 1. The winding of the motor is applied to the stator and includes a single closed ring circuit formed of a plurality of winding sections I, II . . . X, XI, forming eleven winding sections. Preferably, the number of winding sections of the motor is odd. The winding sections are connected by junctions 1, 2, 3 . . . 10, 11, as shown in FIG. 1; thus, winding section I extends between junctions 1 and 2, winding section II between junctions 2 and 3 and so on; winding section XI extends between the junction 11 and junction 1, so that the circuit is a closed ring. The physical construction of the winding sections I to XI can be in accordance with well known prior art constructions and, for example, as is customary in rotor windings for d-c motors having a mechanical commutator. Of course, the windings for the motor in accordance with the present invention, as shown in FIG. 1, are in the stator, for example in stator slots.

FIG. 1 illustrates, schematically, the rotor L, formed as a permanent magnet having a North pole and a South pole S, rotatable about a midpoint M forming a rotation axis; the rotor can be connected to a shaft to provide the output power coaxial with the axis of rotation M. If an odd number of windings are used, the rotor will be opposite a junction at one side and diametrically opposite a winding on the other. A two-pole rotor is shown; the diagram can be considered, also, as the equivalent diagram of a multi-pole motor in which the angles illustrated in FIG. 1 will correspond to electrical angles; thus, the rotor L would be opposite a junction and a winding displaced 180°—electrical with respect to the junction, corresponding to the junction 1 in FIG. 1.

Figure 2:
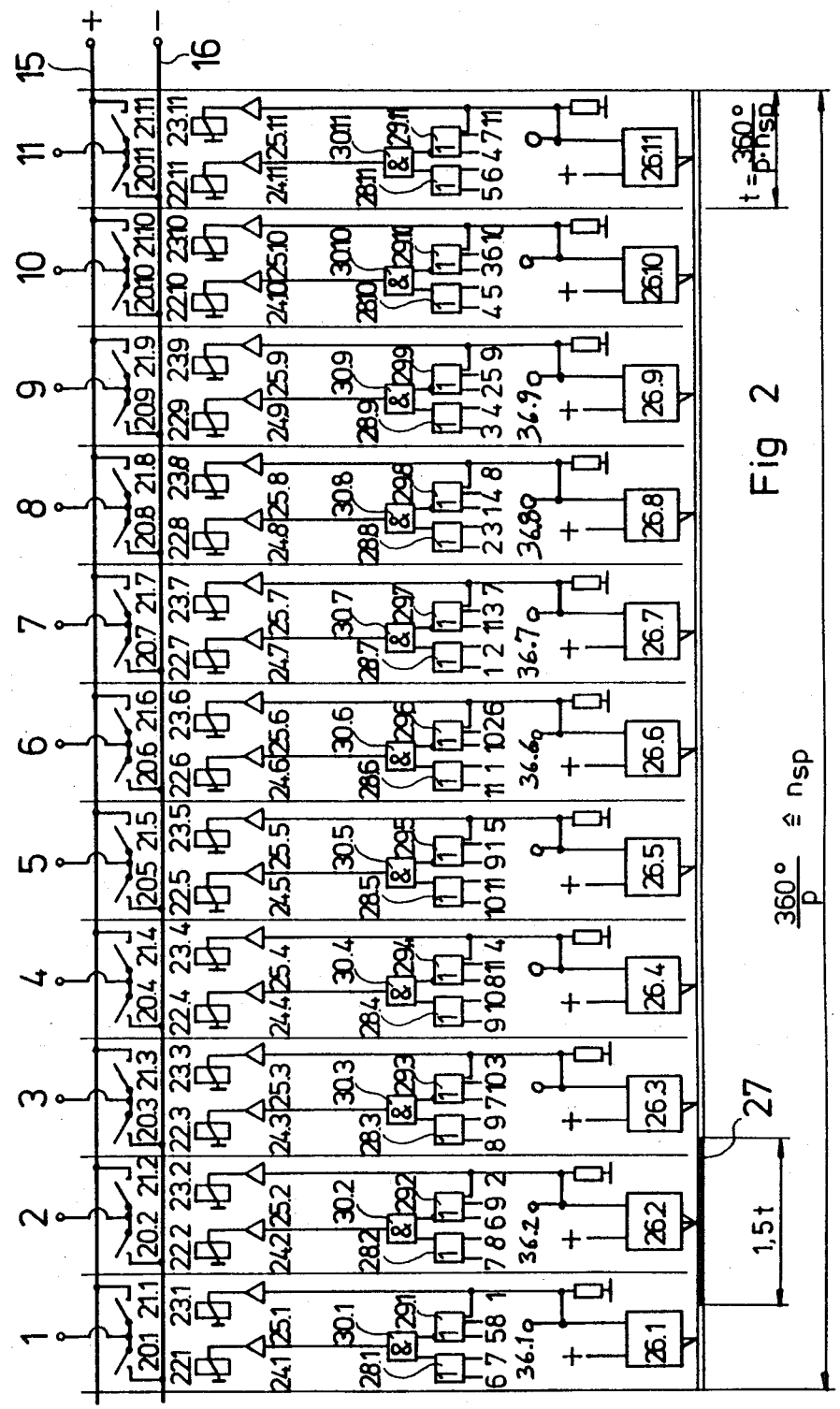
FIG. 2 is a schematic circuit diagram of the control and energization circuit for the motor, schematically shown in FIG. 1.

The energization and control circuit to energize the windings I, II . . . XI is shown in FIG. 2, in which the windings have been omitted for clarity; the junctions 1, 2, 3 . . . 10, 11 are shown. Each one of the junctions can be connected to either a positive bus 15, forming a positive energization source supply terminal, or a negative bus 16, forming the negative terminal of the energization source. The following notation has been used to facilitate the description: The various elements shown in the drawing, and associated with a junction, have been given reference numerals, in which the decimal point indicates the association with the respective junction; thus, switches 20.1 and 21.1 are associated with junction 1, switches 20.2, 21.2 with junction 2, and so on. When reference is made hereinafter to any one element or component without the decimal designation, it is to be understood that similar elements will be present in all the respective elements associated with the other junctions and having the appropriate decimal notation.

Reverting again to FIG. 2: The junction 1 can be selectively connected to either the positive or negative bus 15, 16 if, respectively, switch 20 or 21 is closed. Switches 20, 21 are shown as relay operated switches, controlled by relay coils 22, 23, respectively. Of course, rather than using mechanical relays, electronic relays and, for example, transistors can be used, in which the switches 20, 21 would correspond, respectively, to the emitter-collector paths or equivalent current paths in other semiconductor elements; and the relay coils 22, 23 would correspond to a connection to a control electrode, for example the base of a transistor. For ease of understanding and drawing, however, the embodiment of the invention is illustrated in FIG. 2 with a relay circuit. In a preferred form, however, the relays would be replaced by essentially instantaneously operating semiconductor switches.

Each one of the control connections for the switches 20, 21, in the drawings the connecting lines to the relays 22, 23 have an amplifier 24, 25, respectively, connected thereto. The amplifiers for junction 1 are shown at 24.1 and 25.1, respectively.

The rotor and stator have a rotor position sensor system associated therewith. A rotor position sensor for the motor, as shown, is formed by reflection light gates 26.1, 26.2 . . . 26.11 cooperating with a marker or reflection element 27 located on the rotor L (FIG. 1). The reflex light gates 26.1, 26.2 . . . are located in a circle, for example opposite the illustration of the junctions 1, 2 . . . in FIG. 1; the marker 27 forming, for example a reflex element, extends over 1.5 circular or arc divisions of the winding sections, that is, as shown in FIG. 2, extends over a distance of 1.5 t, in which t corresponds to the arc width of a coil section (see FIG. 1). In accordance with a feature of the invention, the light gates 26, forming position sensors to sense the position of the rotor L, are connected to a control logic which insures that the respective switches 20, 21, in dependence on the then existing position of the rotor, will be closed, that is, at all rotor positions connect the appropriate winding junctions with the respective terminals of the operating source to provide maximum motor torque with minimum variation or undulation as the rotor rotates.

In accordance with a feature of the invention, the control logic is formed by a direct connection from the sensing element 26 to the switch control relay 23—through the amplifier 25—and by logic gates which are connected to control the other switch 20 of the appropriate winding or, rather, the winding junction or junctions, so that a closed electrical energization circuit will be formed. The logic gates for any one of the junctions are formed by a NOR-gate 29, connected to receive input from the sensor 26, an OR-gate 28, and an AND-gate 30, receiving the outputs from the OR-gate 28 and the NOR-gate 29. The output of the AND gate is connected to the input of the amplifier 24 which energizes the relay coil 22 or, if the switch is a semiconductor switch, is coupled to the control input thereof, for example a base terminal.

One input of the NOR-gate 29 is connected with the output of the position sensor, formed by the reflex light gate 26; this input, as noted above, is also connected to the amplifier 25. The two further inputs of the NOR-gate 29 and the two inputs of the OR-gate 28 are connected, as shown by the indices on FIG. 2, with the outputs of selected light gates of other junction systems. For example, one input of the OR-gate 28.1 is connected with the output 36.6 of the light gate 26.6. The second input to the OR-gate 28.1 is connected to the output terminal 36.7 of the reflex light gate 26.7. The second input of the NOR-gate 29.1 is connected to the output terminal 36.8 of the reflex light gate 26.8 and the third input of the NOR-gate 29.1 is connected to the output terminal 36.5 of the light gate 26.5. The corresponding connections for the two inputs of the OR-gate 28.2 are the output terminals of the reflex light gates of sections 7 and 8; the inputs to the NOR-gates 29.2 are from the terminals with decimal indices 6 and 9. The connection of all the terminals is shown in FIG. 2.

In general, and for an odd number of n terminals, the gates are connected:

OR-gate 28: $(n+1)/2$; and $(n+1)/2+1$

NOR-gate 29: $(n+1)/2-1$; $(n+1)/2+2$.

OPERATION

Let it be assumed that the marker 27 is positioned as shown in FIG. 2, that is, opposite the light gate 26.2 and essentially centrally thereof. Sensor 26.2 is energized or activated, and provides a 1- or energization signal via amplifier 25.2 to energize the relay coil 23.2. This causes the switch 21.2 to close, placing the positive bus 15 of the energization source on the junction 2.

In addition to this connection, the logic gates of other junction logic systems are connected to the output of the light gate 26.2 as follows: Referring to the decimal indices, light gage 26.2 is connected to one input of the NOR-gate 29.6, to one input of the OR-gate 28.7, one input of the OR-gate 28.8, and to one input of the NOR-gate 29.9.

Upon generation of a signal from the output of the reflex gate 26.2 to an input of the NOR-gate 29.6, the output signal of this NOR-gate will become zero, and thus the output of the corresponding AND-gate 30.6 will likewise be zero. Relay coil 22.6 is disconnected and, since the terminal 36.6 of the light gate 26.6 likewise does not have any input—the marker 27 being opposite the junction 2—the relay coil 23.6 likewise will be deenergized.

Connection of a signal from terminal 36.2 forming the output of the reflex light gate 26.2 to the input of the OR-gate 28.7 provides a 1-signal to one input of the AND-gate 30.7. Since all three inputs of the NOR-gate 29.7 have a 0-signal thereon, the output from the NOR-gate will be a 1-signal, thus causing the AND-gate 30.7 to conduct and provide a 1-signal which is amplified over the amplifier 24.7 to energize the relay coil 22.7 causing the switch 20.7 to close, so that the junction 7 is connected to the negative terminal of the operating energization source.

In similar manner, the connection of the output terminal 36.2 from the light gate 26.2 with one input of the OR-gate 28.8 causes the relay coil 22.8, or the corresponding control connection to a semiconductor switch, to be energized since the three inputs of the NOR-gate 29.8 will not have a signal thereon. Consequently, the AND-gate 30.8 will be energized for connection of the relay coil 22.8. The output terminal 36.2 from the light gate 26.2 also provides a 1-signal to the NOR-gate 29.9. Consequently, the input to the NOR-gate 29.9 will have a signal at 1-level thereon, so that the output of the NOR-gate 29.9 will be zero, and hence the AND-gate 30.9 will be blocked, so that relay coil 22.9 will be de-energized.

As the above description and the circuit arrangement of FIG. 2, when considered in combination with the windings of FIG. 1, show, the junction 2 will be connected to a positive supply and the two junctions 7 and 8 to the negative terminal of the supply source. The coil section VII, thus, for this rotor position is short-circuited. Current can flow in the ring winding from junction 2, connected to positive bus 15, in either direction of the ring to the junctions 7 and 8, which are connected to the bus 16 by the respective switches 20.7, 20.8 with the coil VII itself being short-circuited. The circuit, thus, is closed.

As the rotor rotates, and the reflex marker 27 shifts sequentially, the other coil sections will contribute to build the rotary electrical torque in similar manner to a mechanical commutator. Upon further movement of the marker 27 upon rotation of the rotor L, the reflex light gate 26.2 as well as the reflex light gate 26.3 will be covered. At that time, the following connections will be established: Relay 23.2 as well as relay 23.3 are energized, and thereby connect the junctions 2 and 3 with the positive terminal of the operating source. This causes the two switches to close and the coil section II, between the junctions 2 and 3, will be short-circuited. The connection of the output 36.3 of the reflex light gate 26.3 with the second input of the NOR-gate 29.7 causes the NOR-gate 29.7 to inhibit a signal, and thus, due to the presence of the AND-gate 30.7, the relay 22.7 will be de-energized. The switch 20.7 drops out and junction 7 is separated from the negative bus 16 of the operating or energization source. The relay coil 22.8 for the switch 20.8, however, remains energized. The junction 9, however, will be de-energized. OR-gate 28.9 receives one input at terminal 3, but the AND-gate 30.9 will not become conductive since the terminal 2 of NOR-gate 29.9 still has a 1-signal thereon, so that the output applied to the AND-gate 30.9 will be a 0-signal. The result will be that, due to the short-circuiting of the coil II, and the energization of junction 8, the magnetic field of the winding, in accordance with a movement of the marker 27, has shifted by a half division of the coil sections, that is, by 0.5 t.

Upon further rotary movement, the marker will be opposite only the light gate 26.3, and the above-described connection sequence will repeat, with all decimal indices incremented by 0.1 for the respective logic components, relay coils and switches.

The circuit arrangement in accordance with the present invention has the substantial advantage that it requires only a few logic components, easily made, and processing digital circuitry, so that by use of digital technology, the overall control logic can be readily constructed. It provides for supply of a motor from a direct current source which is exactly analogous to the operation of a mechanical commutator. The circuit is particularly adaptable for integration and miniaturization. By simple interchange of the terminals 15 and 16, that is, by connecting bus 15 to a negative supply and bus 16 to a positive supply, the operating direction of the motor can be changed. This substantially simplifies the control circuit for a brushless, electronically controlled d-c motor.

The position sensor, sensing the position of the rotor, can take various forms; for example, a coded position sensor, such as a disk with a Gray code, may be used which, corresponding to the number of winding sections, has at least double the number of positions. A simple decoding circuit, well known in the art, then can provide for the control signals for the switches, as above described.

The invention is applicable to any number n of winding sections; preferably, however, n should be odd and greater than 3.

Figure 3:
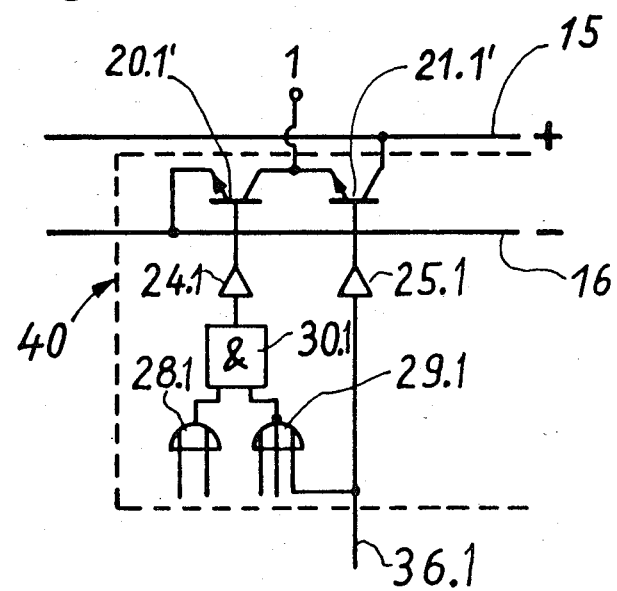
FIG. 3 is a fragmentary view of a portion of the network of FIG. 2, utilizing semiconductor switch elements rather than relays.

For integration, the embodiment of FIG. 3 can be used. FIG. 3 is a highly fragmentary diagram, illustrating only the logic section connected to terminal 1, in which the same elements have been given the same reference numerals. The switches 20.1, 21.1 have been replaced by semiconductor switches 20.1', 21.1'; the amplifiers 24.1, 25.1 are connected to the control terminal of the respective semiconductor switches. The semiconductor switches are shown in their simplest form, as transistors; if reversibility, that is, change of operating direction of the motor is desired, bipolar semiconductor switches must be used. The logic elements, and if appropriate for the respective power consumption, can all be placed on a single integrated circuit substrate, shown schematically by the broken lines 40.

The notation in FIG. 2 illustrating the division t also shows that the explanation and FIG. 2 is concerned with electrical degrees, wherein p is the number of pole pairs, and $n_{sp}$ the number of coil sections serially connected in a closed ring.

Preferably, if semiconductor switches 20.1', 21.1' collectively, 20. ', 21. ', are used, the semiconductor switches should have substantial voltage separation with respect to control voltage and motor energization or power supply voltage.

I claim:

1. Control and energization circuit for a brushless d-c motor having a stator (S) and a magnetic rotor (L);

a stator winding comprising a plurality of winding sections (I, II . . . XI), ring-connected and located on the stator, adjoining winding sections being coupled by a junction (1, 2 . . . 11) serially connecting said adjoining winding sections;

a rotor position sensing means (26) associated with respective junctions and determining of the rotor has a predetermined relative position with respect to any selected junction;

a source (15, 16) of d-c power; and a control and supply network selectively connecting the terminals (15, 16) of the source to selected junctions in accordance with the position of the rotor, said control and supply network comprising:

a plurality of network systems associated with the junctions (1, 2 . . . 11), each network system including a first switch (21) controllably connecting a first terminal (15) of the source to the associated junction;

a second switch (20) controllably connecting a second terminal (16) of the source to the associated junction;

and a logic network (25, 23; 28, 29, 30, 24, 22) responsive to a signal from the rotor position sensing means and, selectively, controlling said first switch of the associated junction and a second switch of another junction, in accordance with a predetermined switching logic.

2. The circuit of claim 1, wherein said logic network controls the second switch of a junction approximately 180°-electrical displaced from said associated junction.

3. The circuit of claim 1, wherein said logic network comprises a direct connection from said sensing means to said first switch, to control the first switch directly as a function of the position of the rotor position sensing means (26) of the associated junction.

4. The circuit of claim 1, wherein the logic network comprises a direct connection from the rotor position sensing means (26) associated with the respective junction, and a network including an OR-function gate (28), a NOR-function gate (29) and an AND-gate (30) controlled by the outputs from said OR-function gate and said NOR-function gate.

5. The circuit of claim 4, wherein an odd number of winding sections (I, II . . . XI) are present, and the logic networks are interconnected with the second switch (20) according to the following logic connection:

one input of the OR-function gate (28.2) associated with a specific junction (2) is connected to an output terminal (36.7, 36.8) of the rotor position sensing means (36.7, 36.8) displaced, effectively, by about 180°-electrical from the specific OR-gate;

the NOR-function gate (29.2) associated with said specific junction (2) is a three-input NOR-function gate, and one input terminal thereof is connected to the output terminal (36.2) of the associated rotor position sensing means, and the other two input terminals thereof are connected to the output terminals of the rotor position sensing means (36.6, 36.9) of the logic network system associated with the junctions (6, 9) of the winding sections (VI, VIII) immediately adjacent the winding section (VII) about 180°-electrical displaced from said specific junction.

6. The circuit of claim 5, wherein the effective sensing range of the rotor position sensing means extends over 1.5 times the circumferential distance of a winding section.

7. The circuit of claim 5, wherein the OR-function gate (28) is a two-input OR-gate (28.2), the two inputs being connected to the outputs (36.7, 36.8) of the rotor position sensing means (26.7, 26.8) which are associated with that one specific network system of the network systems, between which the winding section (VII), which is connected to the respective junctions (7, 8), extends, the respective OR-function gate (28.2) being positioned, effectively, about 180°-electrical from said one specific network system associated with said specific junction (2).

8. The circuit of claim 7, wherein an odd number of winding sections (I, II . . . XI) is present;

and said logic networks of said plurality of network systems control the first and second switch means, respectively, to connect, selectively, one of both first and both second switches coupled to the terminal junctions of a winding section to the same terminal of the output source, thereby short-circuiting the specific winding section when the rotor position sensing means senses that the rotor is at a position with respect to the short-circuited coil which is out-of-alignment with a junction to which the coil is connected.

9. The circuit of claim 1, wherein the first and second switch means, respectively, comprise semiconductor switches (20. ' . . . ; 21. ' . . . ), said semiconductor switches including substantial voltage separation between control voltage for switch operation and motor control voltage.

10. The circuit of claim 9, wherein the semiconductor switches (20. ' . . . ; 21. ' . . . ) and the network systems are located on a common integrated circuit substrate (40).

11. Control and energization circuit for a brushless d-c motor having a stator (S) and a magnetic rotor (L);

a stator winding comprising a plurality of winding sections (I, II . . . XI), ring-connected and located on the stator, adjoining winding sections being coupled by a junction (1, 2 . . . 11) serially connecting said adjoining winding sections;

a rotor position sensing means (26) associated with respective junctions and determining of the rotor has a predetermined relative position with respect to any selected junction;

a source (15, 16) of d-c power; and a control and supply network selectively connecting the terminals (15, 16) of the source to selected junctions in accordance with the position of the rotor, said control and supply network comprising, for each junction (1, 2 ... 11)

a first switch (21) controllably connecting a first terminal (15) of the source to the associated junction;

a second switch (20) controllably connecting a second terminal (16) of the source to the associated junction;

first switch control means (25, 23) for directly controlling the first switch (21), responsive to a signal from the rotor position sensing means, to establish a connection with the first terminal of the source when the rotor position sensing means (26) senses presence of the rotor beneath the associated junction;

and second switch control means (28, 29, 30, 24, 22) including a logic circuit for indirectly controlling the second switch in accordance with a predetermined switching logic, responsive to a signal from the rotor position sensing means to establish a connection with the second terminal of the source when the rotor position sensing means (26) senses presence of the rotor beneath the associated junction.

12. The circuit of claim 11, wherein the second switch control means includes a plurality of logic gates connected to rotor position sensing means of junctions located electrically and diametrically opposite the switch control means which directly connects the first switch when the rotor is beneath the junction associated therewith.

* * * * *